US009220131B1

United States Patent
Williamson et al.

(10) Patent No.: US 9,220,131 B1
(45) Date of Patent: Dec. 22, 2015

(54) INGOT SOLIDIFICATION CONTROLLER FOR VACUUM ARC REMELTING

(76) Inventors: Rodney L. Williamson, Albuquerque, NM (US); Joe Beaman, Austin, TX (US)

(*) Notice: Subject to any disclaimer, the term of this patent is extended or adjusted under 35 U.S.C. 154(b) by 1293 days.

(21) Appl. No.: 12/661,228

(22) Filed: Mar. 12, 2010

(51) Int. Cl.
- *H05B 3/60* (2006.01)
- *H05B 7/07* (2006.01)
- *H05B 7/148* (2006.01)

(52) U.S. Cl.
CPC .................... *H05B 7/148* (2013.01)

(58) Field of Classification Search
CPC ........ H05B 7/148; H05B 7/152; H05B 7/144; H05B 7/07
USPC ............. 373/102, 47, 49, 50, 70, 67, 104, 60, 373/42, 68, 77
See application file for complete search history.

(56) References Cited

U.S. PATENT DOCUMENTS

| | | | |
|---|---|---|---|
| 5,373,529 A * | 12/1994 | Zanner et al. | 373/56 |
| 5,930,284 A | 7/1999 | Hysinger et al. | |
| 6,115,404 A * | 9/2000 | Bertram et al. | 373/70 |
| 6,295,309 B1 | 9/2001 | Benz et al. | |
| 2005/0173092 A1* | 8/2005 | Kennedy et al. | 164/470 |

OTHER PUBLICATIONS

G. Reiter, V. Maronnier, C.Sommistsch, M. Gaumann, W. Schutzenhofer, R. Schneider, Numerical Simulation of the VAR Process with CALCOSOFT-2D and it Validation, LMPC, Sep. 2003, esi-group.com (online).

* cited by examiner

*Primary Examiner* — Hung D Nguyen

(74) *Attorney, Agent, or Firm* — Alberto A. León; AleónLaw, P.C.

(57) ABSTRACT

A method of model-based ingot solidification control for the vacuum arc remelting process is presented. Specifically, the model predicts the pool depth as a function of radial position from ingot centerline and time, given melting current, and electrode melting efficiency. The analysis leading to the model assumes that the electrode gap is being accurately controlled during the melting process. The controller has both 2-dimensional and 3-dimensional embodiments.

8 Claims, 4 Drawing Sheets

INGOT SOLIDIFICATION CONTROLLER FOR VACUUM ARC REMELTING

CROSS-REFERENCE TO RELATED APPLICATIONS

Non-applicable

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

1. Field of the Invention

The invention relates generally to vacuum arc remelting and more specifically to an apparatus and method to improve ingot quality by controlling the solidification of metal alloy ingots.

2. Description of the Related Art Including Information Disclosed Under 37 CFR 1.97 and 37 CFR 1.98

Vacuum arc remelting (VAR) is a process used widely throughout the specialty metals industry for the production of high quality ingots of reactive metal alloys, including, but not limited to, nickel-base superalloys, titanium alloys, zirconium alloys, and uranium alloys. In the VAR process, a cylindrically shaped, alloy electrode (1) is loaded into the water-cooled, copper crucible of a VAR furnace (FIG. 4). The furnace is then evacuated and a direct current electrical arc is struck between the electrode (cathode) and some starting material (e.g. metal chips) at the bottom of the crucible (anode). The arc heats both the starting material and the electrode tip (2), eventually melting both. As the electrode tip is melted away, molten metal drips off forming an ingot in the copper crucible. As the ingot grows, a molten metal, bowl-shaped pool (3) is located at the very top of the solidified ingot due to heat from the electrical arc and dripping liquid metal from the electrode. Because the crucible diameter is larger than the electrode diameter, the electrode must be driven downward toward the ingot pool in such a fashion so that the mean distance between the electrode tip and pool surface remains constant. The speed at which the electrode is driven down is called the electrode feed rate or drive speed. The mean distance between the electrode tip (2) and the ingot pool surface (4) is called the electrode gap.

Solidification control involves simultaneously controlling the electrode feed rate and the melting current with the ultimate goal of directly controlling the shape of the ingot pool. Control of the pool shape is very critical for the success of the VAR process because pool shape fluctuations are known to be related to the formation of material defects during solidification. Current state-of-the-art VAR controllers aim at indirectly controlling ingot pool shape in an open loop fashion by establishing controller set-points for the electrode gap and rate of electrode melting.

Direct control of the ingot pool shape requires a mathematical model that directly relates the process inputs to pool shape so that a pool shape set-point may be entered into the controller. Mathematical models of the VAR ingot solidification process have been developed and some are available commercially. Such a model usually consists of a set of differential equations describing heat conduction, fluid flow, electromagnetic phenomena and mass conservation in the ingot, combined with a specification of the inputs, material properties and ingot boundary conditions required to solve the differential equations. These models are very complex and require numerical methods for their solution. Examples include finite element, finite volume or finite difference methods. The models are non-linear and of very high order. As such, they are not useful for practical control systems design purposes, though very fast 2D ingot models may be useful for control feedback.

The prior art VAR control, which is currently widely used, controls electrode melting rate and electrode gap by using current and electrode drive speed. Typically, electrode gap is controlled indirectly by forcing the process to meet a drip-short frequency set-point reference or a voltage set-point reference. Melt rate control is established using electrode weight as a feedback variable to adjust melting current. The underlying assumption for this method of control is that holding the drip-short frequency (or voltage) and melt rate at their reference set-points produces a constant steady-state ingot pool shape which, in turn, ensures that favorable conditions in the ingot solidification zone are maintained, theoretically producing material free of solidification defects.

The prior art's method of VAR control has serious drawbacks. First, there are common process upsets (called MRE's or melt related events) that cause serious disturbances in melt rate. The only way these can be controlled is with large current responses. However, studies have demonstrated that large current variations affect solidification in the ingot as much as do large variations in melt rate. So controlling at a constant melt rate by allowing current variations has no advantage over holding the current constant and allowing melt rate variations. Neither method provides an effective means of controlling the ingot pool depth through normal process upsets, a problem directly addressed by the ingot pool shape controller of the present invention. A second drawback of the prior art VAR process control is that it is an open loop system with respect to pool depth or shape, the latter being the very process variable that really needs to be controlled. Thus, the currently used VAR process control does not respond to process upsets that affect pool shape but not melt rate. A method of closed-loop feedback control of the pool depth/shape, like the method of the present invention, enables one to control the pool shape directly and in response to process upsets that directly affect solidification. Additionally, the method of the present invention allows one to control the pool shape dynamically so that process control can be optimized during non-steady state operation at the beginning and end of the process.

BRIEF SUMMARY OF THE INVENTION

The VAR process model of the present invention is based on standard heat conduction, mass conservation, fluid dynamic and electromagnetic equations applied with adequate ingot boundary conditions. Boundary conditions were set according to Bertram et al., "Quantitative Simulations of a Superalloy VAR Ingot at the Macroscale," A. Mitchell and P. Aubertin ed's, Proc. of the 1997 International Symposium on Liquid Metals Processing and Casting, Santa Fe, N. Mex., Feb. 16-19, 1997, American Vacuum Society. pp. 110-32. Very accurate, high-order solutions to these nonlinear equations can be obtained by using standard numerical methods such as finite difference, finite volume or finite element analysis. A method of solution more amenable to process control is to linearize the nonlinear equations about a steady state operating point or a time transient trajectory using standard linearization methods (either numerical or analytical) and using the results to describe the process with a set of linear differential equations. These linearized equations can be reduced in order by using linear order reduction methods. For example, fast dynamics can be eliminated and slow dynamics can be retained. Once a reduced order model is developed, state space control methods can be used to design a controller for ingot pool shape.

Alternatively, spectral methods can be used to find approximate low order solutions to the set of non-linear differential equations describing the VAR system dynamics, and this is the method used for this particular embodiment of the invention as described below. These solutions allow for direct calculation of the required process inputs given a reference pool shape and, therefore, can be directly incorporated into a control scheme. Approximate spectral solutions have been carefully compared to numerical solutions from proven ingot models for both stainless steel (304SS) and Alloy 718 (a nickel base superalloy) and found to be in good agreement. Notably, even though the model currently employed is two-dimensional, spectral solutions to a 3-D model may also be readily derived, so the invention is not confined to 2-D models. Indeed, a controller based on a 3-D model is also being disclosed and claimed herein.

The particular embodiment of the invention that was built and tested as a prototype used a simple 2-D model of the solidifying ingot derived from equations describing only conservation of mass and heat conduction. The use of more comprehensive ingot models in this invention, for example models that incorporate equations describing fluid flow and electromagnetic phenomena, is straightforward. The ingot model was simplified by ignoring the mushy zone and assuming that any point in the ingot could be characterized as either purely solid or purely liquid. Thermal diffusivity in the liquid was taken to by three times the thermal diffusivity in the solid. The differential equation that describes conservation of mass for the ingot is $$\dot{H} = \frac{\dot{m}_e}{\rho A_i}$$

where $\dot{H}$ is the time derivative of the ingot height, $\dot{m}_e$ is the electrode melt rate, $\rho$ is the superheat density of the alloy, and $A_i$ is the cross-sectional area of the ingot. Heat conduction is given by $$\frac{\partial h}{\partial t} = \alpha \left[ \frac{\partial^2 h}{\partial z^2} + \frac{1}{r}\frac{\partial}{\partial r}\left(r\frac{\partial h}{\partial r}\right) \right]$$

where h is the mass specific enthalpy, a is thermal conductivity, z locates depth in the ingot from the top surface and r is the radial distance from the ingot centerline. This simple model was given the same boundary conditions as used in Bertram et al. Clearly, this model neglects fluid flow, Joule heating, the mushy zone and variable diffusivity, but it is sufficient to demonstrate the controller. Application of the method to a more complete and comprehensive ingot solidfication model is straightforward.

The model used to demonstrate the present invention predicts the pool depth as a function of radial position from ingot centerline and time, $\delta p(rt)$, given melting current, I, and the electrode melting efficiency, u. This analysis assumes that the electrode gap is being accurately controlled to a set-point reference value during the process. The general form of the model is $$\dot{x} = f(x,u)$$

where x is the state vector defining those variables important to determining the state of the process and u is the input vector defining the controlled and uncontrolled inputs. For this implementation of the invention, u is given by $$u = \begin{bmatrix} I \\ u \end{bmatrix}$$

where I is the process current, which is a controlled process input, and u is the melt rate efficiency, which is an uncontrolled process input. The state variables comprise the thermal boundary layer in the electrode and the various spectral coefficients used to derive the thermodynamic model of the solidifying ingot.

As a crucial part of the present invention, Applicants developed and used a linearized version of the controller to facilitate implementation. Notably, though, complete linearization is not necessary, if the nonlinear process model can be inverted to specify the inputs to obtain the desired pool depths. In the linearized embodiment of the controller, control of the pool depth is accomplished by varying the current about a nominal value:

$$I = I_0 + \delta I$$

The current correction is given by the following vector equation:

$$\delta I = -K_x x_r - K_u \delta u - K_{ref} y_{ref}$$

where $x_r$ is a reduced order state vector containing n process states, $\delta u$ is the change in efficiency, and $y_{ref}$ is a vector containing the pool depth setpoints as a function of position along the ingot radius. If there are m pool depth set points, then the gain operator $K_{ref}$ has m components. Because there are n states in the process model, the gain operator $K_x$ has n elements. Values for the elements of the gain operators were derived using standard linear quadratic control design methods.

The dynamics of the process state vector are described by the following vector equation:

$$\dot{x}_r = A_r x_r + B_u \delta u + B_l \delta I$$

That equation will be recognized as being in the standard form of a linear dynamic state space equation with $A_r$ being the nxn state transition matrix and B playing the role of the input coupling matrix. In this particular case, B has been divided into a controllable input matrix ($B_l$) and an uncontrollable or disturbance input matrix ($B_u$). Given these matrix operators, our controller uses this equation to predict the time evolution of the system once the initial state has been specified allowing for continual estimates of pool depth with each controller cycle time. Values for the matrix operators are based on a model of the solidifying ingot that was derived using standard heat conduction and mass conservation equations with appropriate boundary conditions as described above. That yields a relatively high order solution which can then be reduced by linearization and eliminating those components that have frequencies much higher than what is important for controlling the VAR process. Hence, the r-subscripts in the above equation stand for "reduced order".

The reduced order output equation is given by $$y_r = C_r x_r + D_f \delta l$$

where $C_r$ is the reduced order measurement sensitivity matrix and $D_f$ is the output coupling matrix. Again, the output equation is in the standard form used in modern control texts. $C_r$ relates the process ouputs (in this application, the pool depth at the designated radial positions) to the reduced order state vector.

Now, these equations need to be modified for control purposes. The states need to be "augmented" to include the disturbance $\delta u$ and reference outputs $y_{ref}$. Normally $y_{ref}=0$ because we do not want the pool depth to be change during a VAR melt. However, in an active control situation, especially during transient portions of the process such as startup and hottop, we may want to command changes in pool depth. Also, when controlling through a disturbance, efficiency may change. So we need to introduce two new dynamic states into the system. The modified equations are:

$$x_c = \begin{bmatrix} x_r \\ \delta \mu \\ y_{ref} \end{bmatrix}$$

$$y_c = y_r - y_{ref}$$

$$A_c = \begin{bmatrix} A_r & B_\mu & 0 \\ 0 & -\varepsilon_\mu & 0 \\ 0 & 0 & -\varepsilon_{ref} \end{bmatrix}$$

$$B_{l,C} = \begin{bmatrix} B_l \\ 0 \\ 0 \end{bmatrix}$$

$\delta \mu$ and $\varepsilon_{ref}$ are very small positive numbers that have to be artificially introduced to make the system controllable at steady state.

Given those equations, estimates of pool depth for every controller cycle may be obtained given the inputs to the system. Furthermore, current corrections may be derived to command predictable changes in pool depth, i.e. the system may be controlled.

The basic control strategy is to assume that the electrode gap is controlled by changing ram speed according to modern state-of-the-art practice. The melt current is then regulated to achieve the specified pool depth. The equations used to derive the correct melt current to produce the pool depth set-point are obtained using state-space methods found in modern control theory text books and make use of the low order ingot solidification model described above. The controller uses an estimate of melt rate efficiency obtained from an electrode melting process estimator as a disturbance variable. The electrode melting process estimator relies on a low-order melting model derived and published in the above cited reference (Beaman et al.). Estimated melt rate efficiency is used to correct the melt current reference in response to process upsets that give rise to efficiency changes and is critical to the proper functioning of the controller.

DETAILED DESCRIPTION OF THE INVENTION

Figure 1:
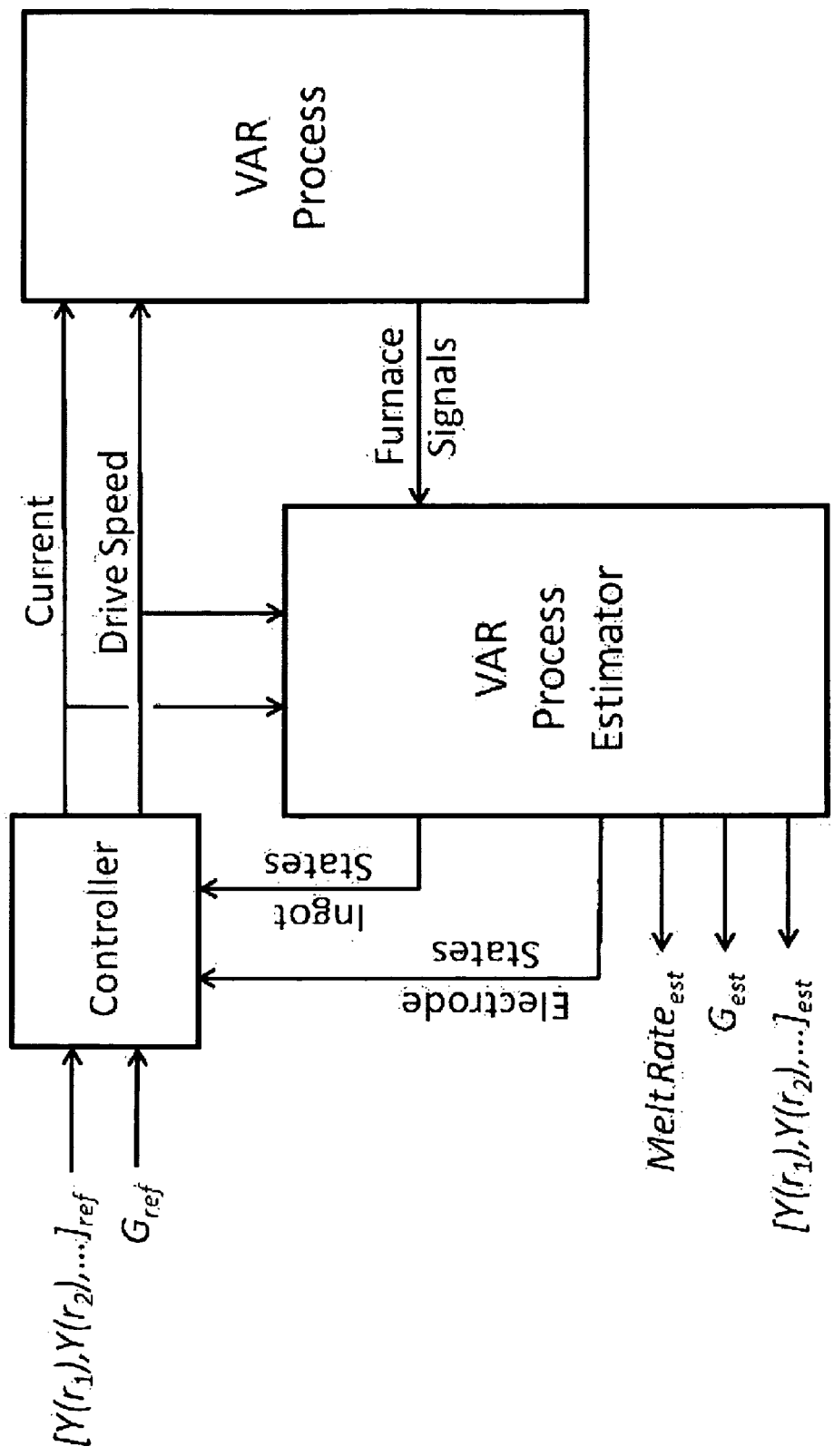
FIG. 1 is a schematic drawing of the general layout of the solidification controller.
Figure 2:
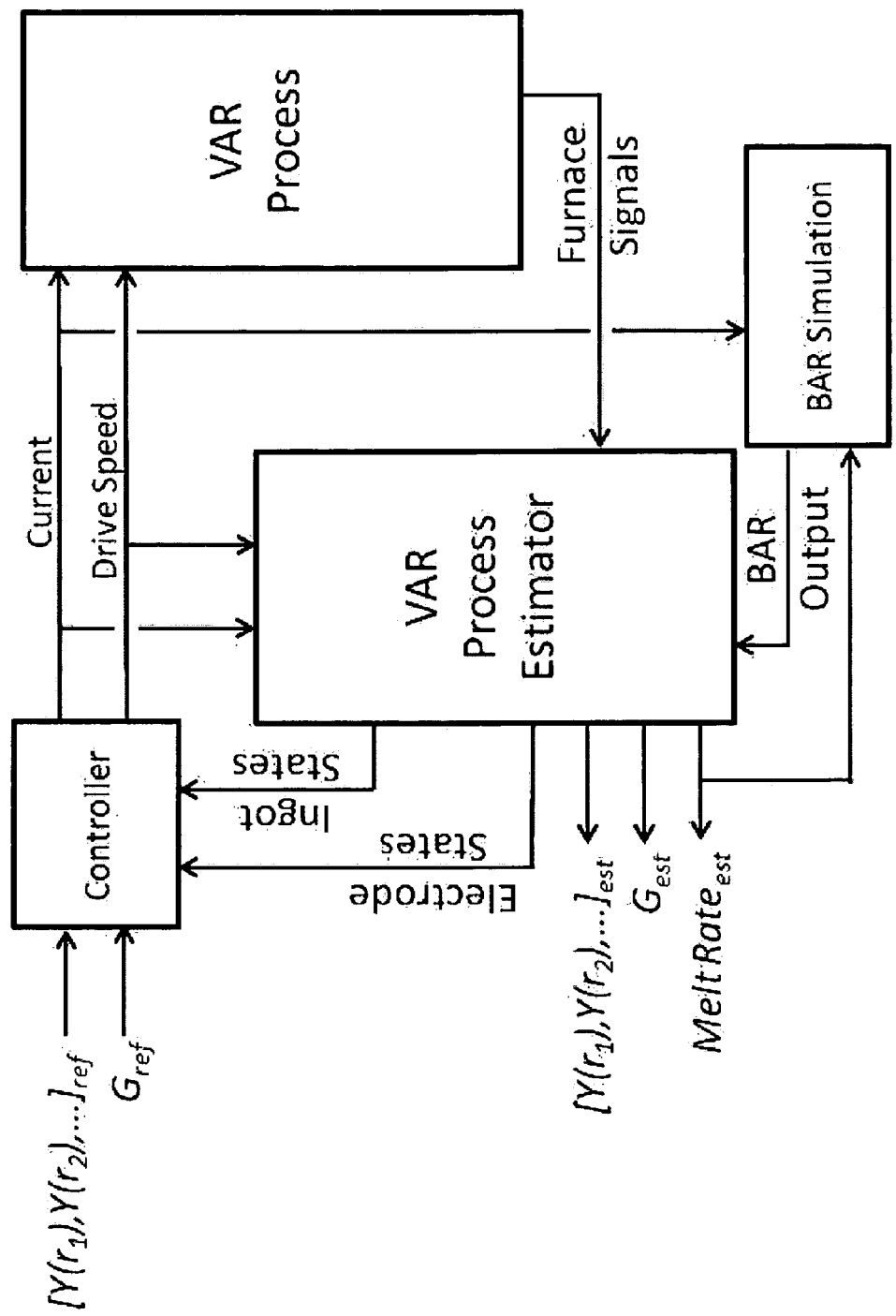
FIG. 2 is a schematic drawing of the solidification controller that uses the 2-D, high order ingot solidification code, BAR, to obtain surrogate pool depth measurements for feedback.

The controller of this invention, as illustrated in FIG. 1, does not provide for direct pool shape feedback because no measurement of pool shape is available. However, Applicants have access to a 2-D, high order ingot simulation code called BAR that has been demonstrated to accurately simulate pool shape based on furnace inputs and outputs. The BAR simulation tool is capable of being used as a direct measurement surrogate for pool shape in a feedback version of the controller (FIG. 2). That high order model, though fast, is not suitable for use in place of the low order model described above because it is neither linear nor invertible.

Figure 3:
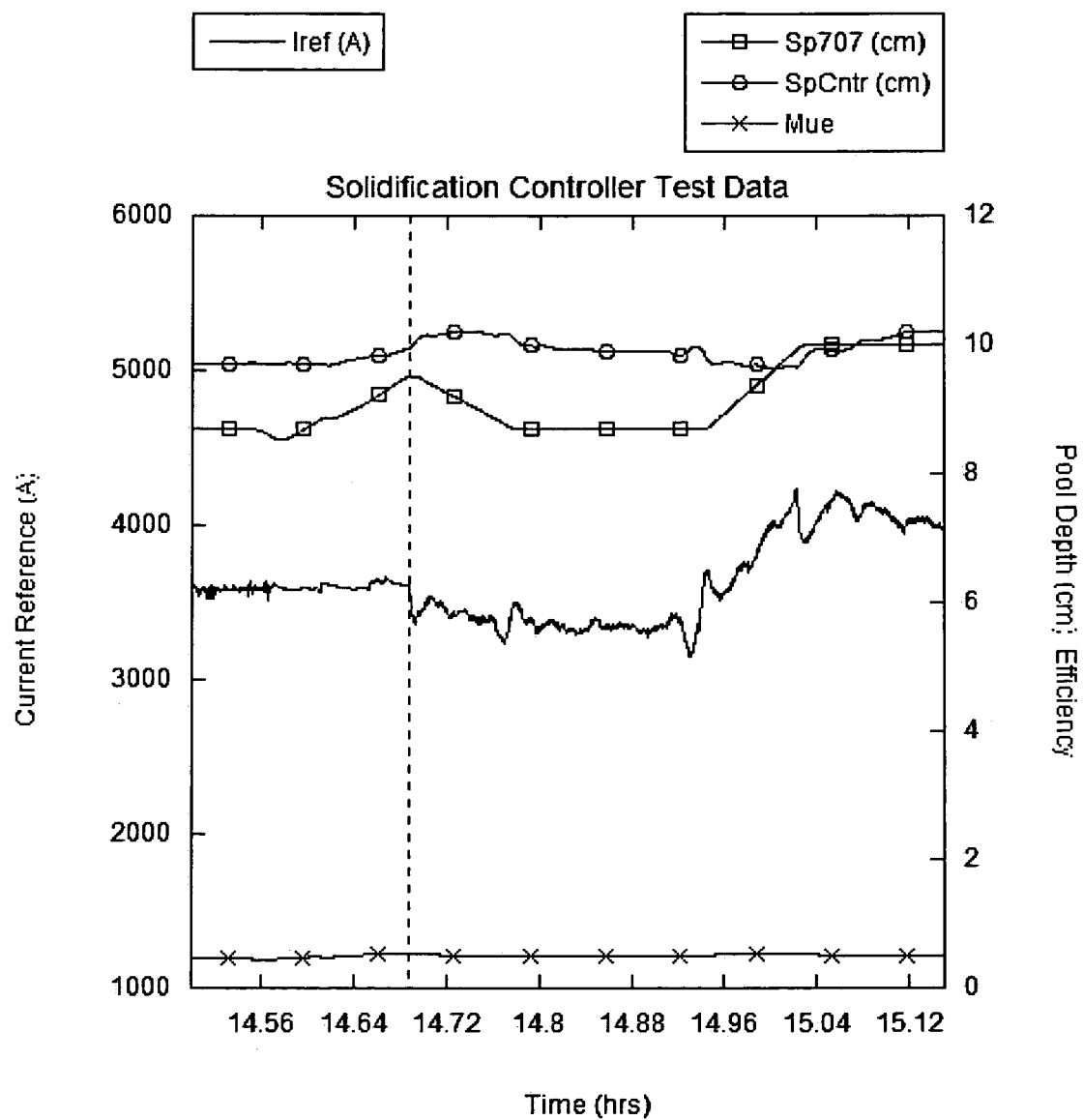
FIG. 3 is a graphic illustration of the effect of current variations in pool depth over time.
Figure 4:
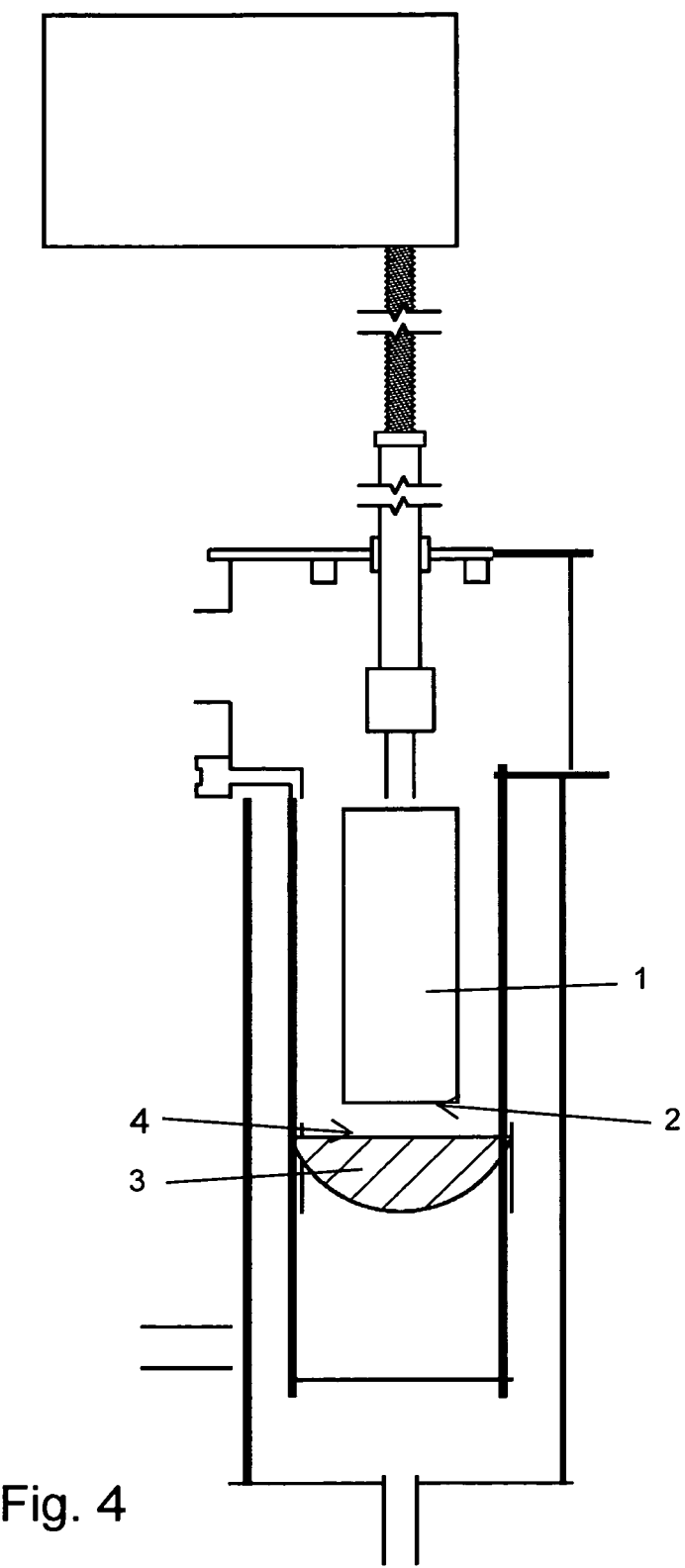
FIG. 4 is a drawing of a prior art VAR furnace.

A 2-D, open loop version of the controller was used on a laboratory VAR furnace while melting 12.7 cm diameter Alloy 718 electrodes into 15.2 cm diameter ingots. The data from one of the controller's runs is shown in FIG. 3. Cuts were put in the electrode to cause efficiency excursions. The plot shows estimated pool depths on the ingot center line (SpCtr) and at 0.707 times the radius from the center line, both in cm, the estimated process efficiency, and the commanded melt current. Sp707 was used as the reference set-point for this test. Multiple pool depth set-points are possible if desired. The dashed line in the figure marks the point at which the solidification controller was switched on. At that point, the pool depth estimator showed a 0.707 R depth of ~9.5 cm. From this point, the controller commanded a 5 minute linear ramp down to a depth of 8.7 cm. After a 10 minute hold at this depth, a 5 minute ramp was commanded up to 10.0 cm, which was held until the end of the test. Note that the pool depth on centerline lags the pool depth of 0.707 R because it takes longer for heat to be conducted to and from the center of the ingot than from a region closer to the edge. This indicates the model dynamics are working correctly.

The controller disclosed and claimed in this application could use other input variables available on many furnaces in industry. For example, crucible cooling water flow rate can be adjusted to aid in controlling pool shape. Additionally, during VAR of superalloys, helium gas is used to enhance heat extraction along the sides of the ingot. This too can be used as an input variable for this controller. In current practice, cooling water flow rate and helium gas flow/pressure are simply set at predetermined values and are not actively controlled in response to any of the process variables. The present invention provides a means to actively use these process inputs for solidification control. Furthermore, images acquired looking down the furnace annulus showing the interface between the crucible and liquid metal pool surface can be used to evaluate pool shape based on the thickness of the solid shelf at the crucible/pool interface. Models relating shelf thickness to pool shape already exist.

Finally, the 3-D version of the controller can make use of optical, image and/or magnetic measurements that indicate arc position and distribution to predict non-symmetrical pool geometries and arc constrictions. The 3-D version should be an extremely valuable quality tool to the industry in that it allows melt engineers to evaluate the effects of off-axis melting on ingot quality and alert them to possible trouble spots in the ingot.

What is claimed is:

1. A method to actively set the pool depth during the physical transformation from liquid to solid of an alloy ingot in vacuum arc remelting using a low-order, ingot solidification model, the method being capable of predicting the ingot's pool depth as a function of radial position from the ingot centerline and time, the method comprising the steps of:

a. manually setting a constant mean distance between an electrode tip being melted and a pool surface being formed;
   b. applying standard heat conduction, fluid flow, electromagnetic and a mass conservation differential equations equation $$\dot{H} = \frac{\dot{m}_e}{\rho A_i}$$

where $\dot{H}$ is the time derivative of the ingot height, $\dot{m}_e$ is the electrode melt rate, $\rho$ is the superheat density of the alloy, and $A_i$ is the cross-sectional area of the ingot, combined with a specification of boundary conditions at the ingot's surface required to solve said equations;
   c. using numerical methods selected from the group consisting of finite volume, finite difference, finite element and spectral method, to provide high order solutions to the heat conduction, fluid flow, electromagnetic and mass conservation equations;
   d. using an order reduction method to produce a low order set of equations;
   e. using solutions of the low order set of equations to predict the physical depth of the ingot pool at chosen ingot radii as a function of vacuum arc remelting process inputs;
   f. incorporating the low order set of equations into a control scheme to control pool depth during vacuum arc remelting, the low order set of equations comprising the form $\dot{x}=f(x,u)$, where x is a state vector that adequately defines the state of transformation from liquid to solid the metal alloy ingot being formed during the vacuum arc remelting process and u is the input vector defining both the controlled and uncontrolled inputs, and the output pool depths defined in a vector y are also a function of x and u, manually setting pool depth references at pre-determined radial positions resulting in a controller that controls the ingot's pool depth at pre-determined radial positions, the radial positions comprising radii selected from the group including about 0 and mid-radius; and
   g. steps a-f resulting in the alloy ingot with a constant pool depth.

2. The method to actively set the pool depth during the physical transformation from liquid to of the alloy ingot in vacuum arc remelting using the low-order, ingot solidification model according to claim 1 wherein the low order set of equations comprise the form of a linear dynamic state space equation $\dot{x}_r = A_r x_r + B_\mu \delta\mu + B_I \delta I$ where $x_r$ is a reduced order state vector containing n process states, $A_r$ is the n×n state transition matrix, B has been divided into a controllable input matrix ($B_I$) and an uncontrollable or disturbance input matrix ($B_\mu$), where $\delta\mu$ is a process efficiency correction term and where the current correction term, $\delta I$, is given as $\delta I = -K_x x_r - K_\mu \delta\mu - K_{ref} y_{ref}$, where $K_x$ is a gain operator comprising n elements and $K_{ref}$ is a gain operator comprising m components, $y_{ref}$ being a vector containing the pool depth set-points of the controller, and comprising the additional steps of:

a. using solutions of the low order set of equations to predict the depth of the ingot pool at chosen ingot radii as a function of vacuum arc remelting process inputs according to an equation of the form $y_r = C_r x_r + D_I \delta I$ where $C_r$ is the reduced order measurement sensitivity matrix and $D_I$ is the output coupling matrix;
   b. incorporating the low order set of equations into a control scheme to control pool depth, wherein the equations are augmented to give control equations of the form $$x_c = \begin{bmatrix} x_r \\ \delta\mu \\ y_{ref} \end{bmatrix},$$

$$y_c = y_r - y_{ref},$$

$$A_C = \begin{bmatrix} A_r & B_\mu & 0 \\ 0 & -\varepsilon_\mu & 0 \\ 0 & 0 & -\varepsilon_{ref} \end{bmatrix},$$

and $$B_{I,C} = \begin{bmatrix} B_I \\ 0 \\ 0 \end{bmatrix}.$$

where $\varepsilon_\mu$ and $\varepsilon_{ref}$ are very small positive numbers that are artificially introduced to make the system controllable at steady state.

3. The method to actively set the pool depth during the physical transformation from liquid to solid of the alloy ingot in vacuum arc remelting using the low-order, ingot solidification model according to claim 1 wherein equations to a 3-D model are derived from mass conservation, heat conduction, electromagnetic and fluid dynamics equations.

4. The method to actively set the pool depth during the physical transformation from liquid to solid of the alloy ingot in vacuum arc remelting using the low-order, ingot solidification model according to claim 1 wherein the approximate low order equations are found using the methods selected from the group consisting of linearization and linear order reduction techniques, multiple time scale order reduction, spectral methods, and physical-based reduction.

5. The method to actively set the pool depth during the physical transformation from liquid to solid of the alloy ingot in vacuum arc remelting using the low-order, ingot solidification model according to claim 1 where the input vector u comprises the controlled current/and the uncontrolled melt rate efficiency $\mu$.

6. A method to actively set the pool depth during the physical transformation from liquid to solid of an alloy ingot in vacuum arc remelting using a low-order, ingot solidification model, the method being capable of predicting the ingot's pool depth as a function of radial position from the ingot centerline and time, the method comprising the steps of:

a. manually setting a constant mean distance between an electrode tip being melted and a pool surface being formed;
   b. applying standard heat conduction, fluid flow, electromagnetic and a mass conservation differential equations $$\dot{H} = \frac{\dot{m}_e}{\rho A_i}$$

where $\dot{H}$ is the time derivative of the ingot height, $\dot{m}_e$ is the electrode melt rate, $\rho$ is the superheat density of the alloy, and $A_i$ is the cross-sectional area of the ingot, combined with a specification of boundary conditions at the ingot's surface required to solve said equations;

c. using numerical methods selected from the group consisting of finite volume, finite difference, finite element and spectral method, to provide high order solutions to the heat conduction, fluid flow, electromagnetic and mass conservation equations;

d. using an order reduction method to produce a low order set of equations;

e. using solutions of the low order set of equations to predict the physical depth of the ingot pool at chosen ingot radii as a function of vacuum arc remelting process inputs; and f. incorporating the low order set of equations into a control scheme to control pool depth during vacuum arc remelting, the low order set of equations comprising the form $\dot{x}=f(x,u)$, where x is a state vector that adequately defines the state of transformation from liquid to solid of the metal alloy ingot being formed during the vacuum arc remelting process and u is the input vector defining both the controlled and uncontrolled inputs, and the output pool depths defined in a vector y are also a function of x and u, manually setting pool depth references at pre-determined radial positions, resulting in a controller that controls the ingot's pool depth at pre-determined radial positions, the radial positions comprising radii selected from the group including about 0 and mid-radius;

g. using high order ingot solidification models as direct measurement surrogates of ingot pool depth for feedback to the controller; and h. steps a-g resulting in the alloy ingot with a constant pool depth.

7. The method to actively set the pool depth during the physical transformation from liquid to solid of the alloy ingot in vacuum arc remelting using the low-order, ingot solidification model according to claim 6 comprising the additional steps of adding helium cooling gas pressure as a controlled input, the effect of the controlled input being predicted by the low-order solidification model and effectively measured by the high order model of claim 6.

8. The method to actively set the pool depth during the physical transformation from liquid to solid of the alloy ingot in vacuum arc remelting using the low-order, ingot solidification model according to claim 6 comprising the additional steps of using crucible cooling water flow rate as a controlled input, the effect of the controlled input being predicted by the low-order solidification model and effectively measured by the high order model of claim 6.

* * * * *